(12) United States Patent
Lam et al.

(10) Patent No.: US 11,468,307 B2
(45) Date of Patent: Oct. 11, 2022

(54) ARTIFICIAL NEUROMORPHIC CIRCUIT AND OPERATION METHOD

(71) Applicants: Jiangsu Advanced Memory Technology Co., Ltd., Jiangsu (CN); ALTO MEMORY TECHNOLOGY CORPORATION, Hsinchu County (TW)

(72) Inventors: Chung-Hon Lam, Hsinchu County (TW); Ching-Sung Chiu, Hsinchu County (TW)

(73) Assignees: Jiangsu Advanced Memory Technology Co., Ltd., Jiangsu (CN); ALTO MEMORY TECHNOLOGY CORPORATION, Hsinchu County (TW)

( * ) Notice: Subject to any disclaimer, the term of this patent is extended or adjusted under 35 U.S.C. 154(b) by 297 days.

(21) Appl. No.: 16/955,026

(22) PCT Filed: Nov. 15, 2019

(86) PCT No.: PCT/CN2019/118804
§ 371 (c)(1),
(2) Date: Jun. 17, 2020

(87) PCT Pub. No.: WO2021/092901
PCT Pub. Date: May 20, 2021

(65) Prior Publication Data
US 2022/0101107 A1     Mar. 31, 2022

(51) Int. Cl.
*G11C 11/54*     (2006.01)
*G11C 13/00*     (2006.01)
*G06N 3/063*     (2006.01)

(52) U.S. Cl.
CPC ................................. *G06N 3/063* (2013.01)

(58) Field of Classification Search
CPC ...... G06N 3/063; G06N 3/049; G06N 3/0635; G06N 3/061; G11C 11/54; G11C 13/0004;
(Continued)

(56) References Cited

U.S. PATENT DOCUMENTS 9,830,981 B2   11/2017  Kim et al.
10,318,861 B2   6/2019  Eleftheriou et al.
(Continued)

FOREIGN PATENT DOCUMENTS

CN   102543172 A   7/2012
CN   102610274 A   7/2012
(Continued)

OTHER PUBLICATIONS

Chung H. Lam, "Neuromorphic Semiconductor Memory", IEEE 2015 International 3D Systems Integration Conference.
(Continued)

*Primary Examiner* — Hien N Nguyen
(74) *Attorney, Agent, or Firm* — CKC & Partners Co., LLC

(57) ABSTRACT

Artificial neuromorphic circuit includes synapse circuit and post-neuron circuit. Synapse circuit includes phase change element, first switch, and second switch. First switch is coupled to phase change element, and is configured to receive first pulse signal. Second switch is coupled to phase change element. Input terminal of post-neuron circuit is coupled to switch circuit, and input terminal is coupled to phase change element. Input terminal charges capacitor through switch circuit in response to first pulse signal. Post-neuron circuit is configured to generate firing signal based on voltage level at input terminal and threshold voltage, and is further configured to generate first control signal and second control signal based on firing signal.

(Continued)

Post-neuron circuit turns off switch circuit according to first control signal. Second control signal is configured to cooperate with second pulse signal to control second switch so as to control a state of phase change element.

13 Claims, 8 Drawing Sheets

(58) Field of Classification Search
CPC . G11C 13/0033; G11C 13/0069; G11C 13/00; G11C 13/004
See application file for complete search history.

(56) References Cited

U.S. PATENT DOCUMENTS

| | | |
|---|---|---|
| 2010/0299297 A1 | 11/2010 | Breitwisch et al. |
| 2015/0278682 A1 | 10/2015 | Saxena |
| 2016/0203400 A1 | 7/2016 | Kim et al. |
| 2016/0203858 A1 | 7/2016 | Kim et al. |
| 2016/0350643 A1 | 12/2016 | Hosokawa et al. |
| 2016/0350647 A1 | 12/2016 | Hosokawa et al. |
| 2016/0371583 A1* | 12/2016 | Hosokawa ............. G06N 3/049 |
| 2017/0364793 A1 | 12/2017 | Kim et al. |
| 2017/0364801 A1 | 12/2017 | Kim et al. |
| 2019/0065929 A1 | 2/2019 | Koelmans et al. |
| 2019/0228292 A1* | 7/2019 | Yasuda ................... G11C 11/54 |
| 2020/0202217 A1* | 6/2020 | Son ....................... G06N 3/0635 |

FOREIGN PATENT DOCUMENTS

| | | |
|---|---|---|
| CN | 102667826 A | 9/2012 |
| CN | 106447033 A | 2/2017 |
| CN | 106470023 A | 3/2017 |
| CN | 106796669 A | 5/2017 |
| CN | 106815636 A | 6/2017 |
| CN | 107111783 A | 8/2017 |
| CN | 107615307 A | 1/2018 |
| CN | 108780520 A | 11/2018 |
| CN | 108921290 A | 11/2018 |
| CN | 109255435 A | 1/2019 |
| CN | 109727678 A | 5/2019 |
| CN | 110188873 A | 8/2019 |

OTHER PUBLICATIONS

S. Kim et al., "NVM Neuromorphic Core with 64k-cell (256-by-256) Phase Change Memory Synaptic Array with On-Chip Neuron Circuits for Continuous In-Situ Learning", 2015 IEEE International Electron Devices Meeting (IEDM), 4 pages.

* cited by examiner

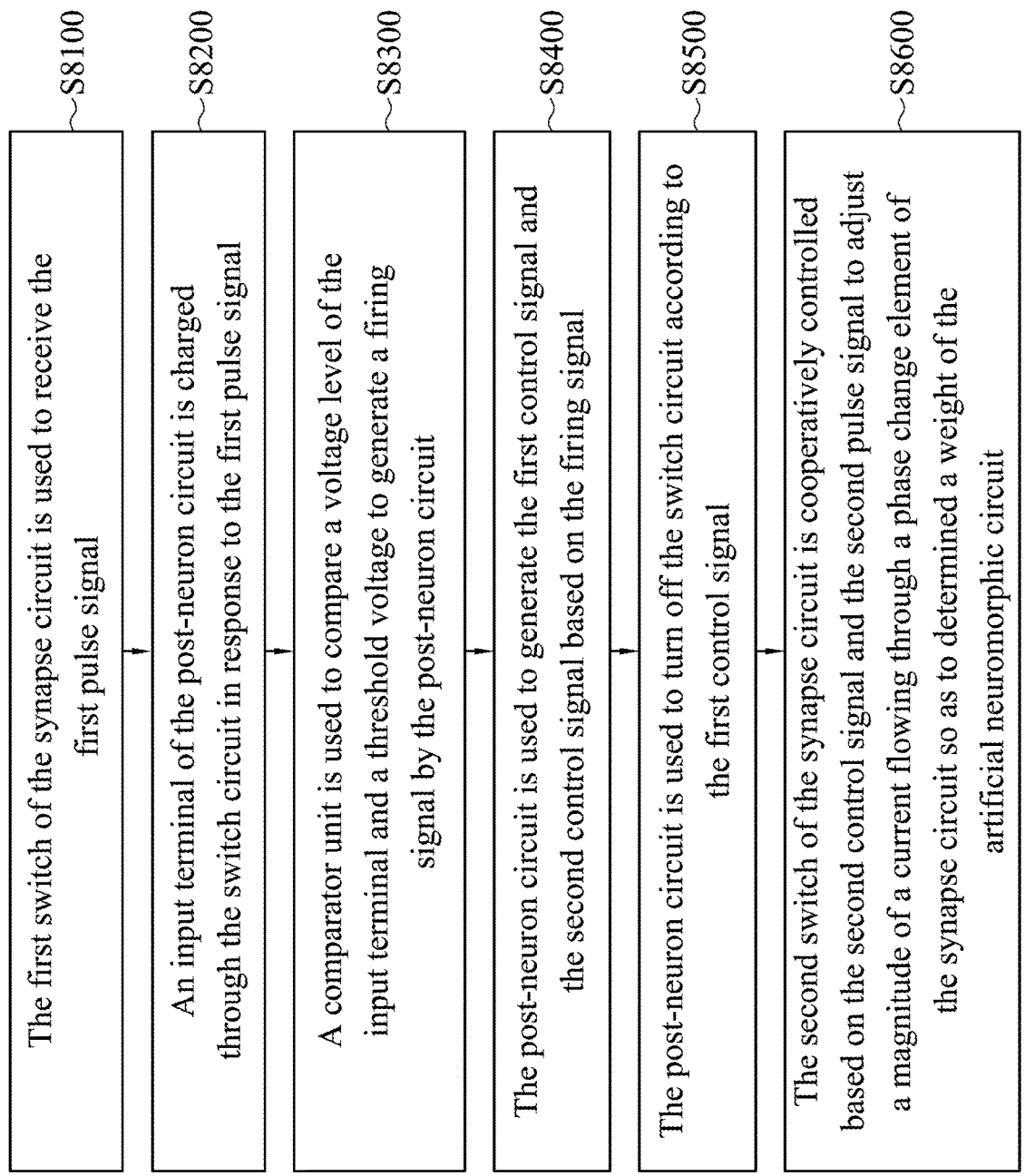

ARTIFICIAL NEUROMORPHIC CIRCUIT AND OPERATION METHOD

RELATED APPLICATIONS

This application is a U.S. National Phase application of PCT/CN2019/118804 filed Nov. 15, 2019, which is herein incorporated by reference.

BACKGROUND

Field of Invention

The present disclosure relates to a circuit technology. More particularly, the present disclosure relates to an artificial neuromorphic circuit and an operation method.

Description of Related Art

A living body has a neural network system. The neural network system contains many neurons. Neurons were proposed by Heinrich Wilhelm Gottfried von Waldeyer-Hartz in 1891. Neurons are processing units that obtain discrete information from the brain. In 1897, Charles Sherrington called the junction between two neurons a "synapse." The discrete information from the brain flows through the synapse along one direction, and the neurons are divided into a "presynaptic neuron" and a "postsynaptic neuron" according to this direction. A neuron emits a "spike" when receiving enough input and being activated.

Theoretically, the captured experience is translated into synaptic conductance in the brain. The synaptic conductance changes over time based on the relative spike times of the presynaptic neuron circuit and the postsynaptic neuron. If the postsynaptic neuron fires before the presynaptic neuron circuit fires, the synaptic conductance will increase. If the two fire in reverse order, the synaptic conductance will decrease. In addition, this change depends on the delay between the two events. The longer the delay, the smaller the change is.

An artificial neural network allows an electronic system to operate in a manner similar to a biological brain. A neuron system may include various electronic circuits that model biological neurons.

A neural network system affects the perception, selection, decision, or various other behaviors of the living body, so the neural network system plays a very important role in the living body. If circuits can be utilized to build neural network systems similar to those in the living bodies, they will have key influences on many areas.

For example, U.S. Pat. No. 9,830,981 or Chinese Patent No. 107111783 mentions that a phase change element and some other elements can be utilized to construct an artificial neural network system.

SUMMARY

An artificial neuromorphic circuit is provided. The artificial neuromorphic circuit comprises a synapse circuit and a post-neuron circuit. The synapse circuit comprises a phase change element, a first switch, and a second switch. The first switch is coupled to the phase change element, and is configured to receive a first pulse signal. The second switch is coupled to the phase change element, and is configured to receive a second pulse signal. The post-neuron circuit comprises an input terminal, a switch circuit, a capacitor, and an output terminal. The input terminal is coupled to the phase change element. The switch circuit is coupled to the input terminal. The capacitor is coupled to the switch circuit. The input terminal charges the capacitor through the switch circuit in response to the first pulse signal. The post-neuron circuit generates a firing signal at the output terminal based on a voltage level of the capacitor and a threshold voltage, and generates a first control signal and a second control signal based on the firing signal. The first control signal is configured to turn off the switch circuit, and the second control signal is configured to cooperate with the second pulse signal to control the second switch so as to control a state of the phase change element.

In some embodiments, the artificial neuromorphic circuit further comprises a pre-neuron circuit. The pre-neuron circuit is coupled to the synapse circuit, and is configured to send the first pulse signal and the second pulse signal.

In some embodiments, the post-neuron circuit further comprises a comparator. The comparator is configured to compare the voltage level of the capacitor and the threshold voltage to generate the firing signal.

In some embodiments, the post-neuron circuit further comprises a first controller and a second controller. The first controller is coupled to the output terminal and a control terminal of the switch circuit. The first controller generates the first control signal to the control terminal according to the firing signal. The second controller is coupled to the output terminal and the input terminal. The second controller generates the second control signal based on the firing signal.

In some embodiments, the switch circuit comprises a transistor.

In some embodiments, the first controller comprises a high pass filter. The high pass filter generates the first control signal after filtering the firing signal to turn off the transistor.

In some embodiments, the second controller comprises a delay circuit and a pulse generator. The delay circuit is coupled to the output terminal and is configured to delay the firing signal. The pulse generator is coupled to the delay circuit and is configured to generate the second control signal according to the delayed firing signal.

In some embodiments, the pulse generator transmits the second control signal to the phase change element.

The present disclosure provides an operation method of an artificial neuromorphic circuit. The operation method comprises: receiving a first pulse signal by using a first switch of a synapse circuit; charging an input terminal of a post-neuron circuit through a switch circuit in response to the first pulse signal; using a comparator unit to compare a voltage level of the input terminal and a threshold voltage to generate a firing signal by the post-neuron circuit; generating a first control signal and a second control signal based on the firing signal by using the post-neuron circuit; turning off the switch circuit according to the first control signal by using the post-neuron circuit; and cooperatively controlling a second switch of the synapse circuit based on the second control signal and a second pulse signal to adjust a magnitude of a current flowing through a phase change element of the synapse circuit so as to determined a weight of the artificial neuromorphic circuit.

In some embodiments, the step of turning off the switch circuit according to the first control signal by using the post-neuron circuit comprises: generating the first control signal to turn off the switch circuit according to the firing single by using a controller of the post-neuron circuit, wherein the controller is coupled to an output terminal of the post-neuron circuit and the switch circuit.

In some embodiments, the switch circuit comprises a transistor. The controller comprises a filter. The step of generating the first control signal to turn off the switch circuit according to the firing single by using the controller of the post-neuron circuit comprises: generating the first control signal after filtering the firing signal by using the filter to turn off the transistor.

In some embodiments, the filter comprises a high pass filter. The step of generating the first control signal after filtering the firing signal by using the filter to turn off the transistor comprises: generating the first control signal after filtering the firing signal by using the high pass filter to turn off the transistor.

In some embodiments the operation method further comprises: delaying the firing signal by using a delay circuit of the post-neuron circuit; generating the second control signal according to the delayed firing signal by using a pulse generator of the post-neuron circuit; and transmitting the second control signal to the phase change element by using the pulse generator.

In summary, the artificial neuromorphic circuit and operation method of the present disclosure can utilize circuits to build an artificial neural network system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 8 depicts a flowchart of an operation method of an artificial neuromorphic circuit according to some embodiments of the present disclosure.

DESCRIPTION OF THE EMBODIMENTS

In this document, the term "coupled" may also be termed "electrically coupled," and the term "connected" may be termed "electrically connected." "Coupled" and "connected" may also be used to indicate that two or more elements cooperate or interact with each other.

Figure 1:
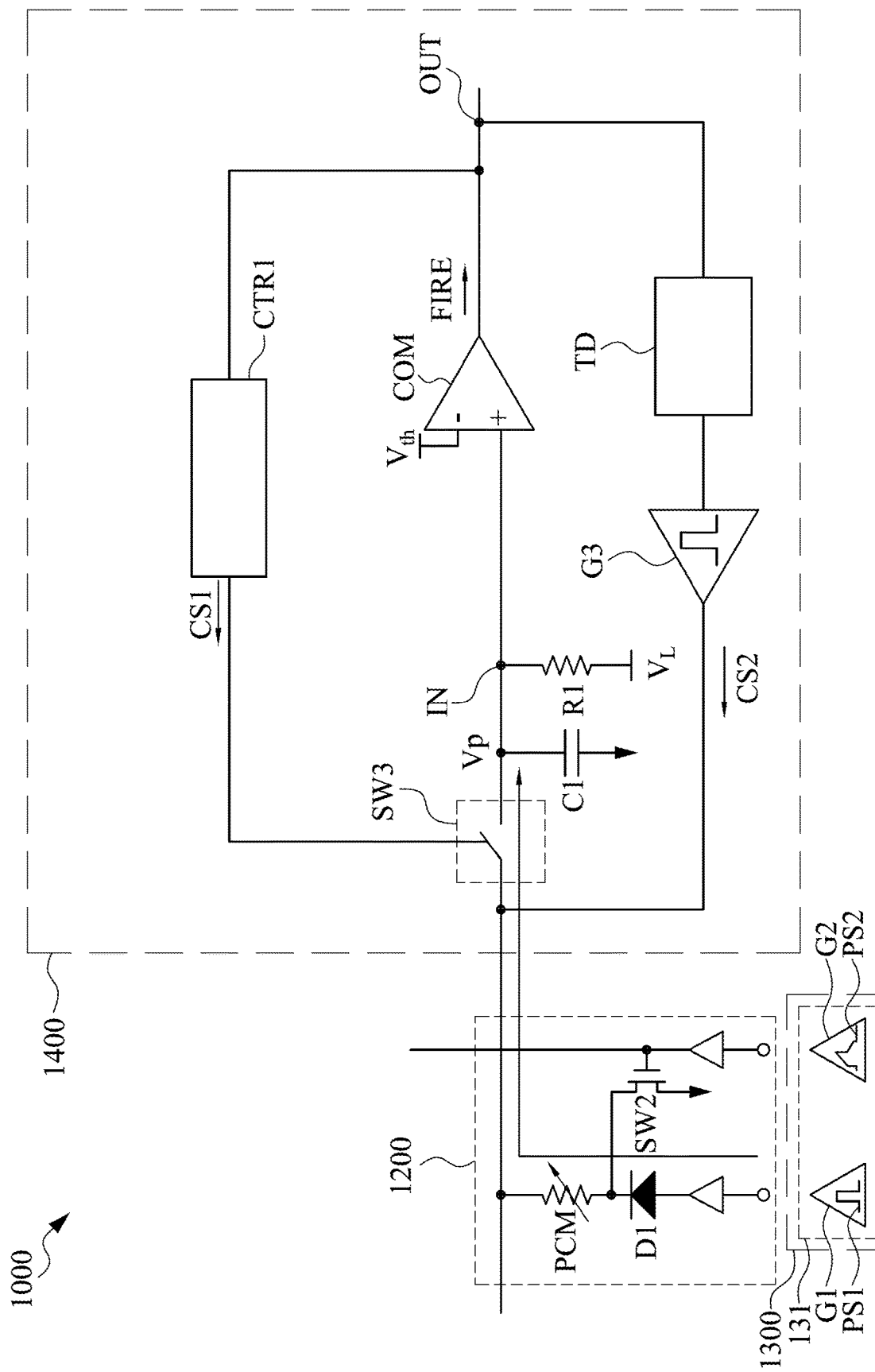
FIG. 1 depicts a schematic diagram of an artificial neuromorphic circuit according to some embodiments of the present disclosure.
Figure 2:
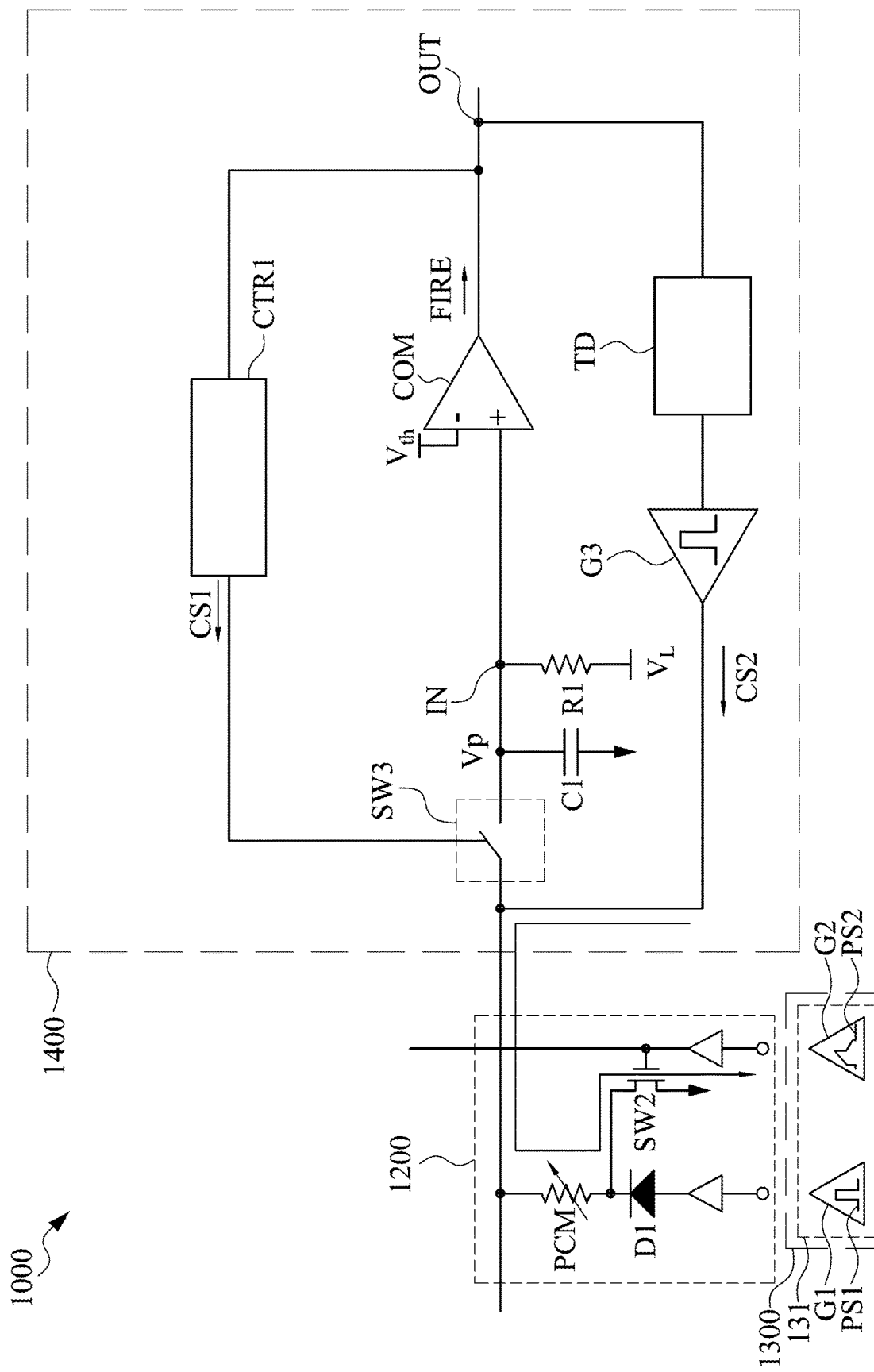
FIG. 2 depicts a schematic diagram of an artificial neuromorphic circuit according to some embodiments of the present disclosure.

A description is provided with reference to FIG. 1 and FIG. 2. FIG. 1 and FIG. 2 depict schematic diagrams of an artificial neuromorphic circuit 1000 according to some embodiments of the present disclosure.

As for the example shown in FIG. 1, the artificial neuromorphic circuit 1000 includes a synapse circuit 1200, a pre-synaptic neuron circuit 1300 (hereinafter referred to as "pre-neuron" 1300), and a post-synaptic neuron circuit 1400 (hereinafter referred to as "post-neuron" 1400). The pre-neuron 1300 includes an axon driver 1310. The axon driver 1310 includes two pulse generators G1, G2. The post-neuron 1400 includes dendrites configured to receive a signal. In some embodiments, the axon driver 1310 of the pre-neuron 1300 sends a spike, which is transmitted to the dendrites of the post-neuron 1400 via the synapse circuit 1200 to stimulate the post-neuron 1400. In this manner, an effect similar to signal transmission in the neural network system is achieved.

In one embodiment, the synapse circuit 1200 includes a phase change element PCM, a switch D1, and a switch SW2. The phase change element PCM includes a phase change material. The phase change material has different phases according to a magnitude of a current. Information can be stored in the phase correspondingly. For example, when the phase change element PCM is in a crystalline phase or a polycrystalline phase, its resistance value is lower. When the phase change element PCM is in an amorphous phase, its resistance value is higher. The phase change element PCM can store logic 1 or 0 according to a magnitude of the resistance value of the phase change element PCM.

In one embodiment, the switch D1 is implemented by using a diode, and the switch SW2 is implemented by using a transistor. In some other embodiments, the switch D1 may also be implemented by using a transistor. The switch D1 includes a first terminal and a second terminal. The first terminal is an anode terminal and the second terminal is a cathode terminal. The first terminal of the switch D1 is coupled to the pulse generator G1 to receive a pulse signal PS1. A control terminal of the switch SW2 is coupled to the pulse generator G2 to receive a pulse signal PS2. The second terminal of the switch D1 and a second terminal of the switch SW2 are coupled to a first terminal of the phase change element PCM. A second terminal of the phase change element PCM is coupled to the post-neuron 1400.

In one embodiment, the post-neuron 1400 includes a switch SW3, a capacitor C1, a resistor R1, a comparator COM, a delay circuit TD, a wave-shaping circuit G3, and a controller CTR1. First terminals of the capacitor C1 and the resistor R1 are coupled to a voltage terminal $V_L$. The voltage terminal $V_L$ may be a low voltage terminal, such as a ground terminal GND. The comparator COM includes a positive input terminal, a negative input terminal, and an output terminal. A second terminal of the capacitor C1 and a second terminal of the resistor R1 are coupled to the positive input terminal of the comparator COM. The second terminal of the phase change element PCM is coupled to the positive input terminal of the comparator COM through the switch SW3 of the post-neuron 1400. The negative input terminal of the comparator COM is configured to receive a threshold voltage $V_{th}$. The output terminal of the comparator COM is coupled to the delay circuit TD and an output terminal OUT. The delay circuit TD is coupled to the wave-shaping circuit G3. The wave-shaping circuit G3 is coupled to the second terminal of the phase change element PCM. The controller CTR1 is coupled to the output terminal OUT and the switch SW3, The capacitor C1 in the post-neuron 1400 simulates an electrical potential of a neuron membrane. There are a variety of charged ions inside and outside the neuron membrane. Due to the differences in the type and charge quantity of the charged ions inside and outside the cell membrane, the capacitor C1 reflects a voltage difference Vp (also called membrane potential Vp) inside and outside the cell membrane. The neuron membrane has channels that are of different sizes and can control the passage of the charged ions. The charged ions inside and outside the cell membrane can pass these channels to cause a change of the membrane potential Vp. The resistor R1 simulates the electrical effect of the passage of charged ions back and forth through the channels. The membrane potential Vp of the post-synaptic neuron membrane is changed after the pulse signal sent by the axon of the pre-synaptic neuron is received by the dendrites of the post-synaptic neuron. The behavioral effect corresponding to the post-neuron 1400 is to charge the capacitor C1.

If an intensity of the above pulse signal is strong enough, the post-neuron 1400 will output a firing signal (FIRE) when the membrane potential Vp of the capacitor C1 exceeds the threshold voltage $V_{th}$. On the contrary, if the intensity of the pulse signal is not strong enough, the post-neuron 1400 will not output the firing signal (FIRE) and its increased membrane potential Vp will gradually decrease through a leakage of the resistor R1 although a voltage on the capacitor C1 rises but, however, does not exceed the threshold voltage $V_{th}$. The behavior on the neuron is that the post-neuron instantly changes the concentrations of charged ions inside and outside the cell membrane due to the firing signal of the pre-neuron, and then the charged ions are balanced by diffusion through the channels on the cell membrane, so that the membrane potential Vp of the post-neuron membrane returns to equilibrium. Therefore, the electrical behavior of the path that the pre-neuron sends the pulse signal to the capacitor C1 of the post-neuron is called leaky integration and fire (LIF). The membrane potential Vp of the neuron is a function of LIF (Vp=F (LIF)).

The firing signal of each pre-neuron affects the membrane potential Vp of the post-neuron 1400 via the synapse (including the axon of the pre-neuron and the dendrites of the post-neuron). However, even with the same firing signal, different pre-neurons have different magnitudes of effects on the membrane potential Vp of the post-neuron 1400. Hence, it can be said that a magnitude of a synaptic weight (W) between the pre-neuron and the post-neuron is different. Synaptic weight (W) is plastic (or called adaptable), and a magnitude of weight change (ΔW) is a function of a time difference between the pre-neuron firing time ($t_{pre}$) and the post-neuron firing time ($t_{post}$): ΔW=F ($t_{post}$−$t_{pre}$). In other words, the magnitude of the change of the synaptic weight (ΔW) is related to the time difference between $t_{pre}$ and $t_{post}$, and the synaptic weight W is adaptively adjusted according to the value of the time difference. Therefore, the synaptic weight W relates to the index of causality between neurons. In this manner, a characteristic index representing that the synapse changes the weight (W) due to the relative relationship between the pre-neuron firing time and the post-neuron firing time is defined, which is called spike timing dependent plasticity (STDP). The STDP of the synapse is also indirectly related to LIF because LIF can determine the post-neuron firing time ($t_{post}$). In one embodiment, the STDP of the synapse represents the plasticity of the conductivity of synaptic current. In greater detail, the STDP of the synapse represents a magnitude of a synaptic resistance in one embodiment.

Figure 3:
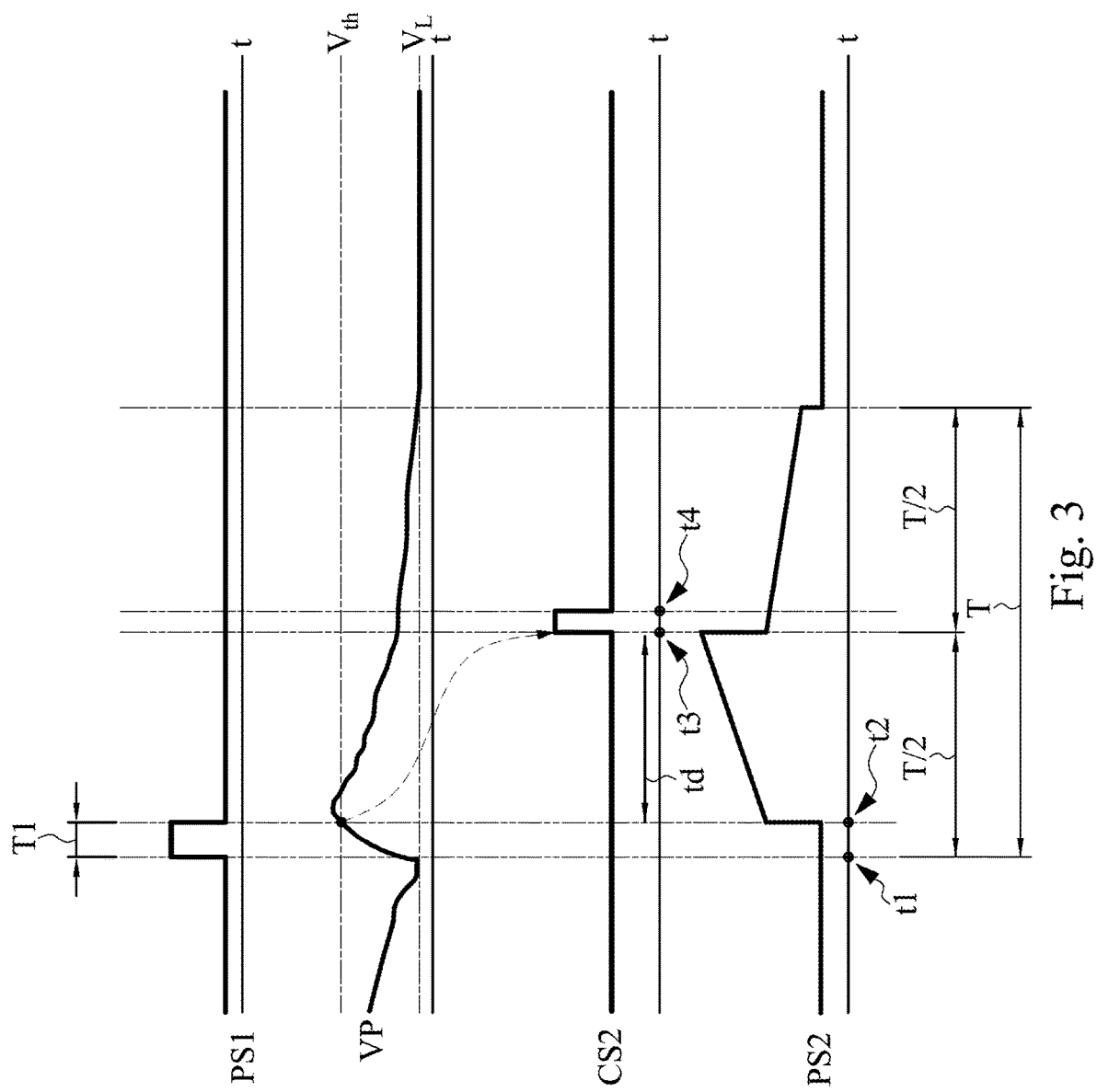
FIG. 3 depicts a waveform diagram of multiple signals according to some embodiments of the present disclosure.

A description is provided with reference to FIG. 1 and FIG. 3. Before the pre-neuron 1300 sends the spike, the membrane potential Vp of the capacitor C1 in the post-neuron 140 gradually moves toward an equilibrium potential (VL) via the resistor R1. In one embodiment, the equilibrium potential (VL) is a ground potential. However, the present disclosure is not limited in this regard. As for the operation, the switch SW3 of the post-neuron 1400 is turned on, the pre-neuron 1300 sends the spike to the post-neuron 1400, the pulse generator G1 in the axon driver 1310 sends the pulse signal PS1 at time t1, and a pulse width time is t1 to t2. During a pulse period (T1), the switch D1 is turned on and the switch SW2 is turned off. In one embodiment, the pulse signal PS1 is also called "axon pulse LIF", and a width is 0.1 milliseconds (ms). However, the present disclosure is not limited in this regard. The axon pulse LIF passes the phase change element PCM of the synapse circuit 1200 and charges the second terminal of the capacitor C1 (the positive input terminal of the comparator COM) through the switch SW3, so that the cell membrane potential has the voltage level Vp.

As shown in FIG. 3, the membrane potential Vp gradually rises during the time interval T1. If the voltage level Vp of the capacitor C1 is higher than the threshold voltage $V_{th}$ of the negative input terminal of the comparator COM before time t2 (including the point t2), the output terminal of the comparator COM immediately sends the firing signal FIRE at this time. When the membrane potential Vp is lower than the threshold voltage $V_{th}$, the comparator COM does not output the firing signal FIRE. Therefore, the magnitude of the resistance value of the phase change element PCM can control the speed of charging the capacitor C1.

At time t2, the pulse generator G2 of the axon driver 1310 generates the pulse signal PS2. In one embodiment, the pulse signal PS2 is also called "axon pulse STDP". In one embodiment, a pulse time period T of the axon pulse STDP is 100 ms. However, the present disclosure is not limited in this regard. The axon pulse STDP is divided into two time zones of equal time (T/2) front and latter. The pulse in the front time zone (T/2) is instantly increased by a voltage value (not marked), and is then gradually increased. The pulse in the latter time zone (T/2) is instantly reduced by a voltage value (not marked), and is then gradually lowered. In greater detail, a highest voltage value of the axon pulse STDP in the latter time zone is smaller than a lowest voltage value in the latter time zone. After the axon pulse LIF ends, the membrane potential of the capacitor C1 in the post-neuron 1400 will be gradually discharged through the resistor R1 and returns to the equilibrium value of the cell membrane potential.

A description is provided with reference to FIG. 2 and FIG. 3. The firing signal FIRE sent by the output terminal of the comparator COM passes the controller CTR1 to immediately generate a control signal CS1 so as to turn off the switch SW3. At this time, the signal of the synapse circuit 1200 can no longer affect the voltage of the capacitor C1 in the post-neuron 1400. At the same time, the firing signal FIRE passes the delay circuit TD and the wave-shaping circuit G3 to output a control signal CS2 to the second terminal of the phase change element PCM. The delay circuit TD will add a delay time td to the firing signal FIRE. In one embodiment, the delay time td is 50 ms. After the above delay time td, the control signal CS2 is sent to the second terminal of the phase change element PCM at time t3. A pulse duration of the control signal CS2 is from time t3 to time t4. In one embodiment, the above control signal CS2 is also referred to as a "post-synaptic neuron STDP trigger", and its pulse duration is 0.1 ms.

The controller CTR1 sends the control signal CS1 to turn off the switch SW3 and maintain a turn-off state to be longer than (including equal to) the pulse time period T of the axon pulse STDP (PS2). The capacitor C1 starts to discharge through the resistor R1, and the membrane potential Vp gradually decreases. During this period T, the post-neuron can no longer receive the signal transmitted from any other synaptic circuit. During the pulse duration of the control signal CS2, the current flowing through the phase change element PCM in the synapse circuit 1200 is determined by the cooperative effect of the pulse signal PS2 (the axon pulse STDP) and the control signal CS2 (the post-synaptic neuron STDP trigger). In other words, signals of the axon pulse STDP (PS2) and the post-synaptic neuron STDP trigger (CS2) can determine a magnitude of the current flowing through the phase change element PCM.

The axon pulse STDP (PS2) controls a gate of the switch SW2 of the synapse circuit 1200. During the front time zone (T/2) of the axon pulse STDP (PS2), its voltage is higher and a current that can flow through the switch SW2 is larger. Conversely, during the latter time zone (T/2) of the axon pulse STDP (PS2), its voltage is lower and the current that can flow through the switch SW2 is smaller. For example, during a pulse period of the post-synaptic neuron STDP trigger, the switch D1 in the synapse circuit 1200 is not turned on. The post-synaptic neuron STDP trigger (CS2) only flows through the phase change element PCM and the switch SW2, and a voltage level of the axon pulse STDP (PS2) can control a magnitude of the current flowing through the switch SW2.

In one embodiment, if the firing signal (FIRE) of the post-neuron 1400 is caused by the axon pulse LIF (PS1) of the pre-neuron 1300, the firing time ($t_{post}$) of the post-neuron 1400 is later than the firing time ($t_{pre}$) of the pre-neuron 1300. At this time, the pulse duration of the post-synaptic neuron STDP trigger (CS2) will fall into the latter time zone (T/2) of the axon pulse STDP (PS2). Therefore, the current that instantly flows through the switch SW2 is smaller, which means that the current instantly flowing through the phase change element PCM is smaller. As a result, the phase change element PCM has a lower resistance value. In other words, the synapse circuit 1200 has a better conductivity, so it is called synapse long term potentiation. It indicates that the firing of the post-neuron 1400 is related to the pulse signal PS1 (the axon pulse LIF) of the pre-neuron 1300. The firing of the post-neuron 1400 is causally related to the firing of the pre-neuron 1300. The weight W of the synapse circuit 1200 that is connected between the two neurons is thus raised.

In one embodiment, if the firing signal (FIRE) of the post-neuron 1400 is not caused by the axon pulse LIF (PS1) of the pre-neuron 1300, the firing time ($t_{post}$) of the post-neuron 1400 is earlier than the firing time ($t_{pre}$) of the pre-neuron 1300. At this time, the pulse duration of the post-synaptic neuron STDP trigger (CS2) will fall into the front time zone (T/2) of the axon pulse STDP (PS2). Therefore, the current that instantly flows through the switch SW2 is larger, which means that the current instantly flowing through the phase change element PCM is larger. As a result, the phase change element PCM has a higher resistance value. In other words, the synapse circuit 1200 has a poorer conductivity, so it is called synapse long term depression. It indicates that the firing of the post-neuron 1400 is not causally related to the firing of the pre-neuron 1300. The weight W of the synapse circuit 1200 that is connected between the two neurons is thus reduced.

The artificial neuromorphic circuit 1000 can utilize the above operations to learn behaviors so as to realize the neural network system similar to that in a living body.

Figure 4:
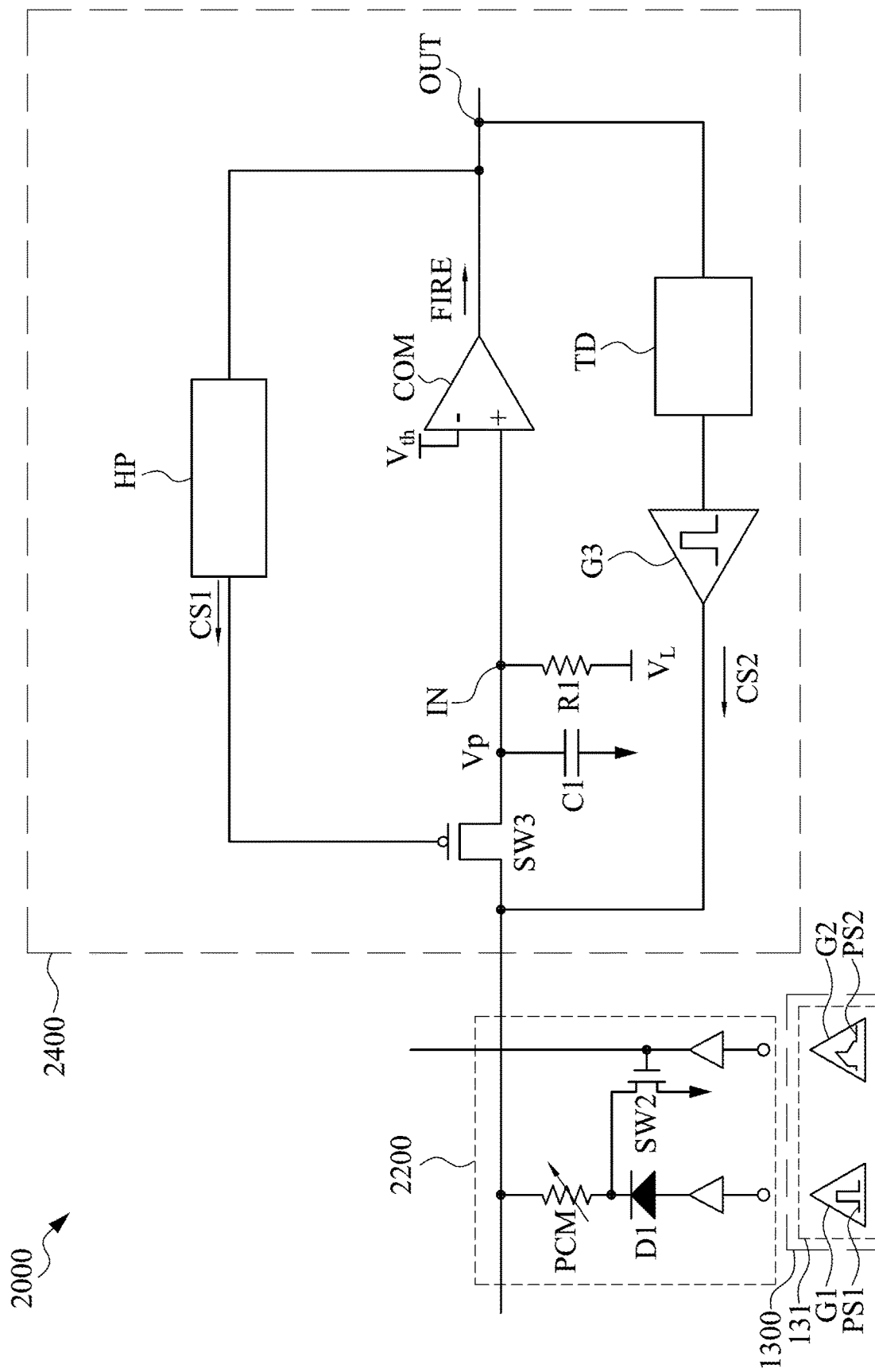
FIG. 4 depicts a schematic diagram of an artificial neuromorphic circuit according to some embodiments of the present disclosure.

A description is provided with reference to FIG. 4. FIG. 4 depicts a schematic diagram of an artificial neuromorphic circuit 2000 according to some embodiments of the present disclosure. The artificial neuromorphic circuit 2000 of FIG. 4 differs from the artificial neuromorphic circuit 1000 of FIG. 1 in that a controller of a post-neuron 2400 of the artificial neuromorphic circuit 2000 is a filter HP and the switch SW3 is a transistor.

For example, the filter HP is coupled to the output terminal OUT and a gate of the transistor SW3. When the membrane potential Vp is higher than the threshold voltage $V_{th}$, the comparator COM will output the positive firing signal FIRE. At the same time, the filter HP immediately generates the control signal CS1 after receiving the firing signal FIRE to turn off the transistor SW3. Since the connection relationships and operations of the other components of the artificial neuromorphic circuit 2000 are similar to those of the artificial neuromorphic circuit 1000 of FIG. 1, a description in this regard is not provided.

Figure 5:
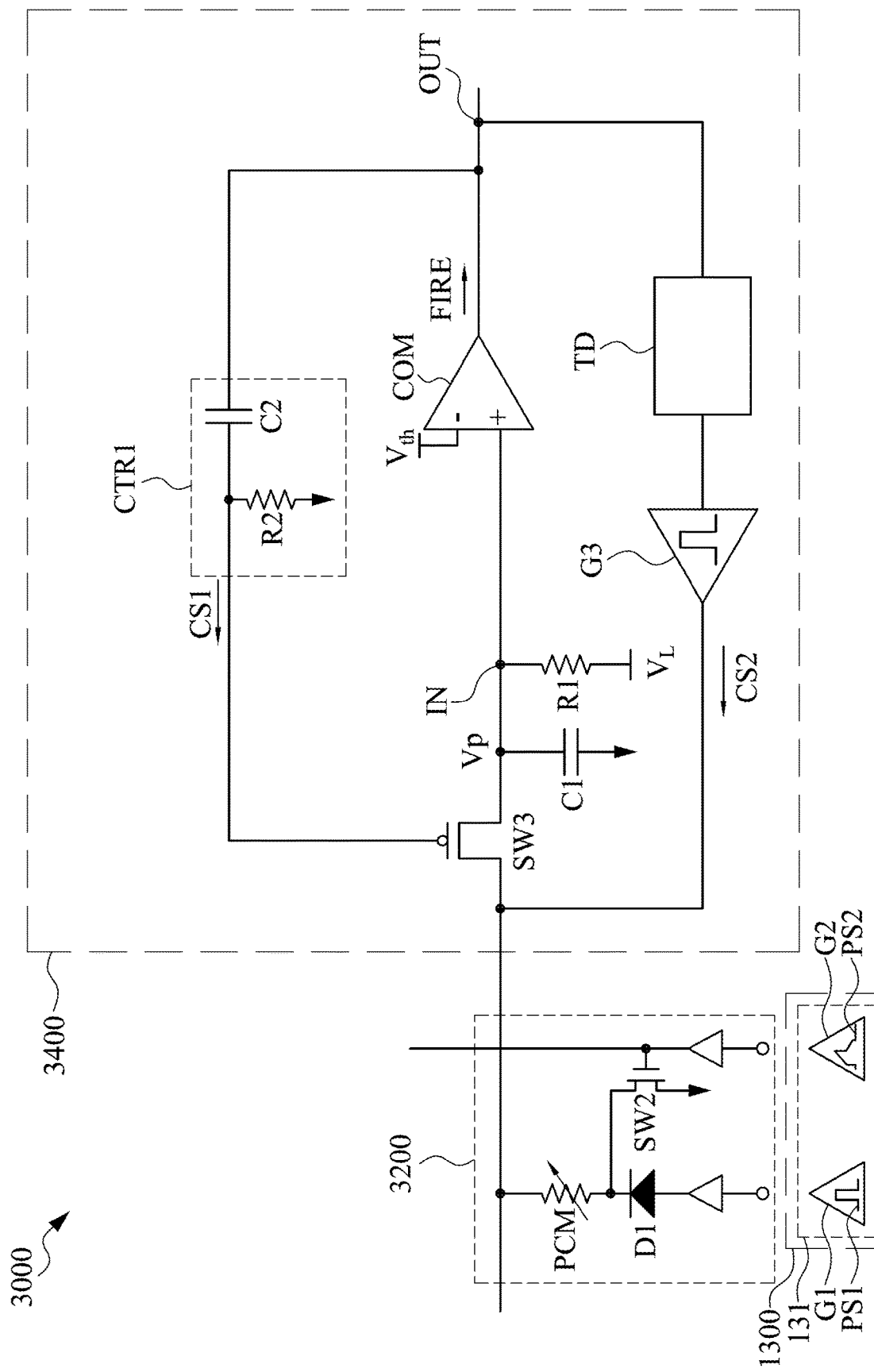
FIG. 5 depicts a schematic diagram of an artificial neuromorphic circuit according to some embodiments of the present disclosure.

A description is provided with reference to FIG. 5. FIG. 5 depicts a schematic diagram of an artificial neuromorphic circuit 3000 according to some embodiments of the present disclosure. The artificial neuromorphic circuit 3000 of FIG. 5 differs from the artificial neuromorphic circuit 2000 of FIG. 4 in that FIG. 5 shows the filter HP of the post-neuron 2400 of the artificial neuromorphic circuit 3000 in detail.

For example, the filter HP is a high pass filter. The high pass filter HP includes a capacitor C2 and a resistor R2. The transistor SW3 is a PMOS. When the membrane potential Vp is higher than the threshold voltage $V_{th}$, the comparator COM outputs the positive peak firing signal FIRE. At the same time, the high pass filter HP immediately generates the high-level control signal CS1 after receiving the firing signal FIRE to turn off the PMOS (SW3). It is noted that a duration of a turn-off time of the PMOS (SW3) can be determined by adjusting the time constant τ of the capacitor C2 and the resistor R2 of the high pass filter HP. Since the connection relationships and operations of the other components of the artificial neuromorphic circuit 3000 are similar to those of the artificial neuromorphic circuit 1000 of FIG. 1, a description in this regard is not provided.

Figure 6:
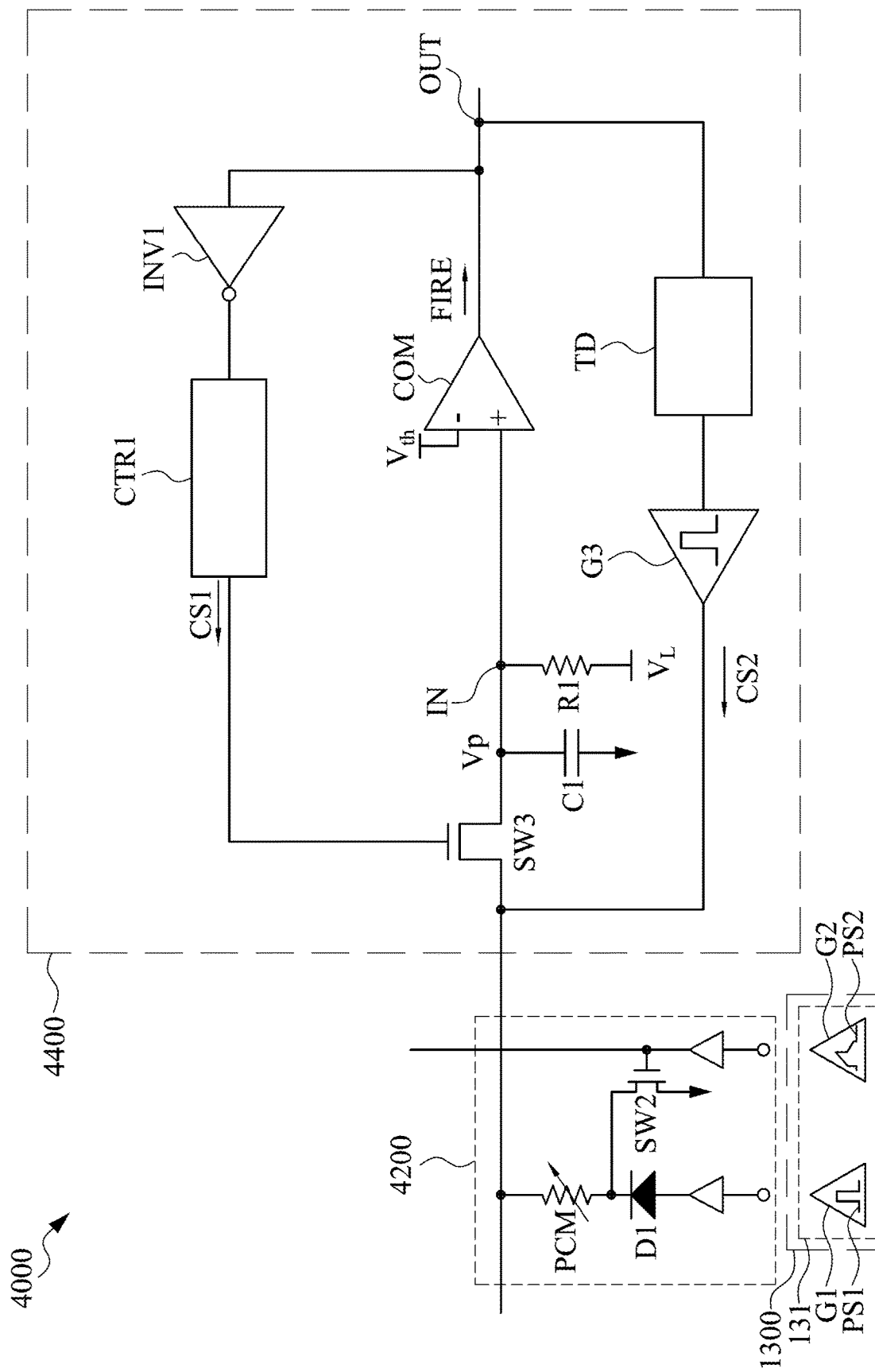
FIG. 6 depicts a schematic diagram of an artificial neuromorphic circuit according to some embodiments of the present disclosure.

A description is provided with reference to FIG. 6. FIG. 6 depicts a schematic diagram of an artificial neuromorphic circuit 4000 according to some embodiments of the present disclosure. The artificial neuromorphic circuit 4000 of FIG. 6 differs from the artificial neuromorphic circuit 1000 of FIG. 1 in that a controller of a post-neuron 4400 of the artificial neuromorphic circuit 4000 is a filter HP. In addition, the artificial neuromorphic circuit 4000 further includes an inverter INV1 and the switch SW3 is an NMOS in FIG. 6.

For example, the filter HP is coupled to a gate of the NMOS (SW3), and is coupled to the output terminal OUT through the inverter INV1. When the voltage level Vp at the positive input terminal is higher than the threshold voltage $V_{th}$, the comparator COM will output the high-level firing signal FIRE. The inverter INV1 receives the firing signal FIRE to generate an inverted signal. The filter HP immediately generates the low-level control signal CS1 after receiving the inverted signal to turn off the NMOS (SW3). Since the connection relationships and operations of the other components of the artificial neuromorphic circuit 4000 are similar to those of the artificial neuromorphic circuit 1000 of FIG. 1, a description in this regard is not provided.

Figure 7:
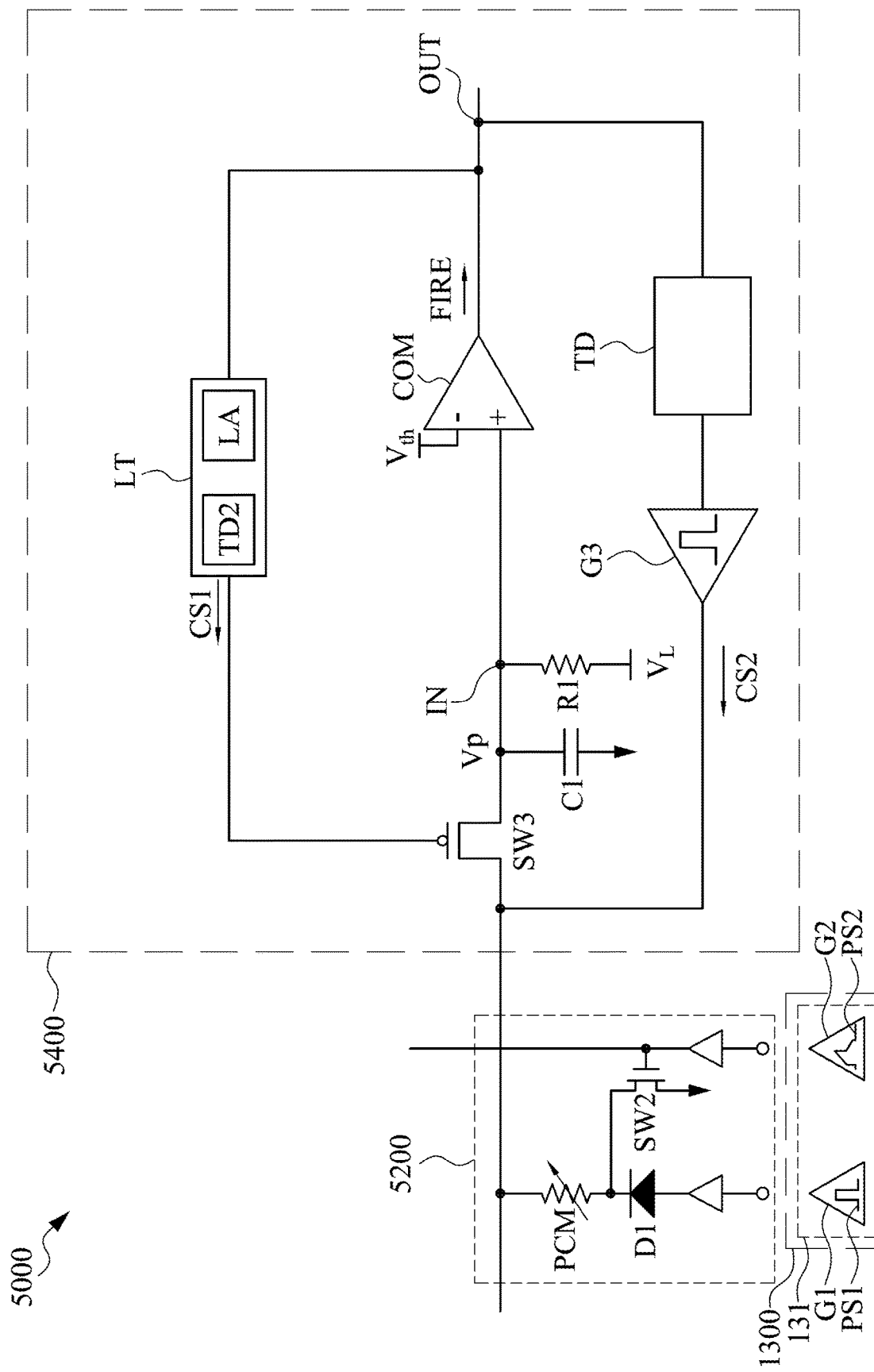
FIG. 7 depicts a schematic diagram of an artificial neuromorphic circuit according to some embodiments of the present disclosure.

A description is provided with reference to FIG. 7. FIG. 7 depicts a schematic diagram of an artificial neuromorphic circuit 5000 according to some embodiments of the present disclosure. The artificial neuromorphic circuit 5000 of FIG. 7 differs from the artificial neuromorphic circuit 1000 of FIG. 1 in that a controller of a post-neuron 5400 of the artificial neuromorphic circuit 5000 can be implemented by a level latch LA and a delay circuit TD2. However, the present disclosure is not limited in this regard. The level latch LA and the delay circuit TD2 are configured to control a turn-off time and a turn-on time of the switch SW3. For example, after the firing signal (FIRE) of the post-neuron is sent, the level latch LA immediately generates a high voltage to turn off the PMOS (SW3), and the delay circuit TD2 delays a high voltage signal for a period of time to maintain a turn-off state of the PMOS. Since the connection relationships and operations of the other components of the artificial neuromorphic circuit 7000 are similar to those of the artificial neuromorphic circuit 1000 of FIG. 1, a description in this regard is not provided.

A description is provided with reference to FIG. 8. FIG. 8 depicts a flowchart of an operation method 8000 of an artificial neuromorphic circuit according to some embodiments of the present disclosure. Take the example shown in FIG. 8 as an example, the operation method 8000 includes an operation S8100, an operation S8200, an operation S8300, an operation S8400, an operation S8500, and an operation S8600. In some embodiments, the operation method 8000 is applied to the artificial neuromorphic circuit 1000 of FIG. 1, but the present disclosure is not limited in this regard. To facilitate understanding, a discussion is provided with reference to FIG. 1 as follows.

In operation S8100, the switch D1 of the synapse circuit 1200 is used to receive the pulse signal PS1. In some embodiments, the synapse circuit 1200 plays the role of an axon of a pre-synaptic neuron to send a spike to the post-neuron 1400.

In operation S8200, a positive input terminal of the post-neuron 1400 (the comparator COM) is charged through the switch SW3 in response to the pulse signal PS1. In some embodiments, the post-neuron 1400 plays the role of dendrites of a post-synaptic neuron to receive a signal from the synapse circuit 1200.

In operation S8300, the post-neuron 1400 is used to generate the firing signal FIRE based on the voltage level $V_p$ of the positive input terminal and the threshold voltage $V_{th}$. In some embodiments, the comparator COM outputs the firing signal FIRE when the voltage level $V_p$ is higher than the threshold voltage $V_{th}$.

In operation S8400, the post-neuron 1400 is used to generate the control signal CS1 and the control signal CS2 based on the firing signal FIRE. In some embodiments, the controller CTR1 of the post-neuron 1400 will generate the control signal CS1 according to the firing signal FIRE. The delay circuit TD of the post-neuron 1400 will add a delay time to the firing signal FIRE to output the control signal CS2.

In operation S8500, the post-neuron 1400 is used to turn off the switch SW3 according to the control signal CS1. In one embodiment, the switch SW3 will be maintained off for a period of time. A duration of a turn-off time of the switch SW3 can be set depending on practical needs.

In operation S8600, the switch SW2 of the synapse circuit 1200 is controlled based on the control signal CS2 and the pulse signal PS2 to control a state of the phase change element PCM of the synapse circuit 1200. Accordingly, a weight of the artificial neuromorphic circuit 1000 can be determined according to the state of the phase change element PCM. In one embodiment, the control signal CS2 flows through the switch SW2, and the pulse signal PS2 controls a magnitude of a current that can flow through the switch SW2. In some embodiments, the phase change element PCM includes a phase change material. Different phases of the phase change material correspond to different resistance values.

The above description of the operation method 8000 includes exemplary operations, but the operations of the operation method 8000 are not limited to the order shown. The order of the operations of the operation method 8000 may be changed, or the operations may be performed simultaneously, partially simultaneously, or partially omitted under appropriate circumstances, which are all within the spirit and scope of the embodiments of the present disclosure.

In summary, the artificial neuromorphic circuit and operation method of the present disclosure can utilize circuits to build an artificial neural network system.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An artificial neuromorphic circuit comprising:
   a synapse circuit comprising:
      a phase change element;
      a first switch coupled to the phase change element, and being configured to receive a first pulse signal; and
      a second switch coupled to the phase change element, and being configured to receive a second pulse signal; and
   a post-neuron circuit comprising:
      an input terminal coupled to the phase change element;
      a switch circuit coupled to the input terminal;
      a capacitor coupled to the switch circuit; and
      an output terminal;
   wherein the input terminal charges the capacitor through the switch circuit in response to the first pulse signal, the post-neuron circuit generates a firing signal at the output terminal based on a voltage level of the capacitor and a threshold voltage, and generates a first control signal and a second control signal based on the firing signal, the first control signal is configured to turn off the switch circuit, and the second control signal is configured to cooperate with the second pulse signal to control the second switch so as to control a state of the phase change element.

2. The artificial neuromorphic circuit of claim 1, wherein the artificial neuromorphic circuit further comprises a pre-neuron circuit, wherein the pre-neuron circuit is coupled to the synapse circuit, and is configured to send the first pulse signal and the second pulse signal.

3. The artificial neuromorphic circuit of claim 1, wherein the post-neuron circuit further comprises:
   a comparator configured to compare the voltage level of the capacitor and the threshold voltage to generate the firing signal.

4. The artificial neuromorphic circuit of claim 1, wherein the post-neuron circuit further comprises:
   a first controller coupled to the output terminal and a control terminal of the switch circuit, wherein the first controller generates the first control signal to the control terminal according to the firing signal; and a second controller coupled to the output terminal and the input terminal, wherein the second controller generates the second control signal based on the firing signal.

5. The artificial neuromorphic circuit of claim 4, wherein the switch circuit comprises a transistor.

6. The artificial neuromorphic circuit of claim 5, wherein the first controller comprises a high pass filter, wherein the high pass filter generates the first control signal after filtering the firing signal to turn off the transistor.

7. The artificial neuromorphic circuit of claim 4, wherein the second controller comprises:

a delay circuit coupled to the output terminal and being configured to delay the firing signal; and a pulse generator coupled to the delay circuit and being configured to generate the second control signal according to the delayed firing signal.

8. The artificial neuromorphic circuit of claim 7, wherein the pulse generator transmits the second control signal to the phase change element.

9. An operation method of an artificial neuromorphic circuit comprising:

receiving a first pulse signal by using a first switch of a synapse circuit;

charging an input terminal of a post-neuron circuit through a switch circuit in response to the first pulse signal;

using a comparator unit to compare a voltage level of the input terminal and a threshold voltage to generate a firing signal by the post-neuron circuit;

generating a first control signal and a second control signal based on the firing signal by using the post-neuron circuit;

turning off the switch circuit according to the first control signal by using the post-neuron circuit; and cooperatively controlling a second switch of the synapse circuit based on the second control signal and a second pulse signal to adjust a magnitude of a current flowing through a phase change element of the synapse circuit so as to determined a weight of the artificial neuromorphic circuit.

10. The operation method of claim 9, wherein turning off the switch circuit according to the first control signal by using the post-neuron circuit comprises:

generating the first control signal to turn off the switch circuit according to the firing single by using a controller of the post-neuron circuit, wherein the controller is coupled to an output terminal of the post-neuron circuit and the switch circuit.

11. The operation method of claim 10, wherein the switch circuit comprises a transistor, the controller comprises a filter, wherein generating the first control signal to turn off the switch circuit according to the firing single by using the controller of the post-neuron circuit comprises:

generating the first control signal after filtering the firing signal by using the filter to turn off the transistor.

12. The operation method of claim 11, wherein the filter comprises a high pass filter, wherein generating the first control signal after filtering the firing signal by using the high pass filter to turn off the transistor comprises:

generating the first control signal after filtering the firing signal by using the high pass filter to turn off the transistor.

13. The operation method of claim 12, further comprising:

delaying the firing signal by using a delay circuit of the post-neuron circuit;

generating the second control signal according to the delayed firing signal by using a pulse generator of the post-neuron circuit; and transmitting the second control signal to the phase change element by using the pulse generator.

\* \* \* \* \*